United States Patent [19]

Mori et al.

[11] Patent Number: 4,467,981
[45] Date of Patent: Aug. 28, 1984

[54] WEBBING RETRACTOR

[75] Inventors: Shinji Mori; Keiichi Tamura, both of Aichi, Japan

[73] Assignee: Kabushiki Kaisha Tokai-Rika-Denki Seisakusho, Aichi, Japan

[21] Appl. No.: 455,834

[22] Filed: Jan. 5, 1983

[30] Foreign Application Priority Data

Mar. 12, 1982 [JP] Japan .............................. 57-35025[U]

[51] Int. Cl.$^3$ ....................... A62B 35/02; B65H 75/48
[52] U.S. Cl. ............................................... 242/107.4 A
[58] Field of Search ................ 242/107.4 A; 280/806; 297/478, 480

[56] References Cited

U.S. PATENT DOCUMENTS 4,046,332 9/1977 Wheeler et al. ............. 242/107.4 A
4,087,059 5/1978 Lindblad ...................... 242/107.4 A

FOREIGN PATENT DOCUMENTS 2852110 6/1979 Fed. Rep. of Germany ... 242/107.4 A

Primary Examiner—John M. Jillions
Attorney, Agent, or Firm—Koda and Androlia

[57] ABSTRACT

An acceleration of a vehicle is detected, whereby a movable body tilts a lever, which in turn tilts a pawl to stop a lock ring in rotation, so that a takeup shaft can be stopped in a direction of webbing unwinding rotation.

When the angle at which the movable body is mounted to a frame rotatably supporting the takeup shaft is changed, members of transmitting means between the lever and the pawl slide on each other, to thereby prevent the lever from being tilted, so that webbing unwinding can be reliably stopped in an emergency situation of the vehicle in the same manner as before even after the angle at which the movable body is mounted to the frame is changed.

22 Claims, 7 Drawing Figures

WEBBING RETRACTOR

BACKGROUND OF THE INVENTION

1. Field of the Invention

The present invention relates to a webbing retractor for instantly stopping the webbing unwinding in an emergency situation of a vehicle, used in a seatbelt system for protecting an occupant in an emergency situation of the vehicle.

2. Description of the Prior Art

In a seatbelt system, one end of an occupant restraining webbing is retracted in layers onto a takeup shaft by a biasing force. During normal condition of the vehicle, this takeup shaft is rotatable in the webbing unwinding direction, however, in an emergency situation of the vehicle, rotation of the webbing in the unwinding direction is stopped by operation of a locking device in a webbing retractor, whereby the occupant is restrained by the webbing.

In this webbing retractor, a movable body, such as a ball, which is caused to move by an acceleration of the vehicle pushes up a lever, which is directly or indirectly engaged with the takeup shaft, whereby the webbing unwinding rotation is stopped.

This movable body is housed in a movable body case, which is secured to a frame to journal the webbing takeup shaft. The angle, at which the frame is mounted to the vehicle body, should be varied from one vehicle to another when the vehicles of different types. In consequence, the mounting angle of the movable body relative to the frame must be changed so that the movable body can be stationary when the frame is mounted to the vehicle body. For this reason, heretofore, it has been necessary to prepare retractors of many types, having different angles, at which the movable body cases are secured to the frame, thus resulting in complicated design and manufacture.

SUMMARY OF THE INVENTION

The present invention has been developed to obviate the above-described disadvantages of the prior art and has as its object the provision of a webbing retractor wherein, even when the mounting angle, at which the frame is mounted to the vehicle body, is changed, the variation in angle can be readily remedied by a slight change.

In the webbing retractor according to the present invention, a transmitting means is provided between a lever tiltable under a tilting force of a movable or inertial body and a pawl tiltable under a tilting force of this lever, and this transmitting means is of such an arrangement that, when the angle, at which a movable body support member is mounted to a frame, is changed, the lever and the pawl are moved relative to each other, so as to remedy the variation in the mounting angle.

Description will hereunder be given of an embodiment of the present invention with reference to the drawings.

DESCRIPTION OF THE PREFERRED EMBODIMENT

Figure 1:
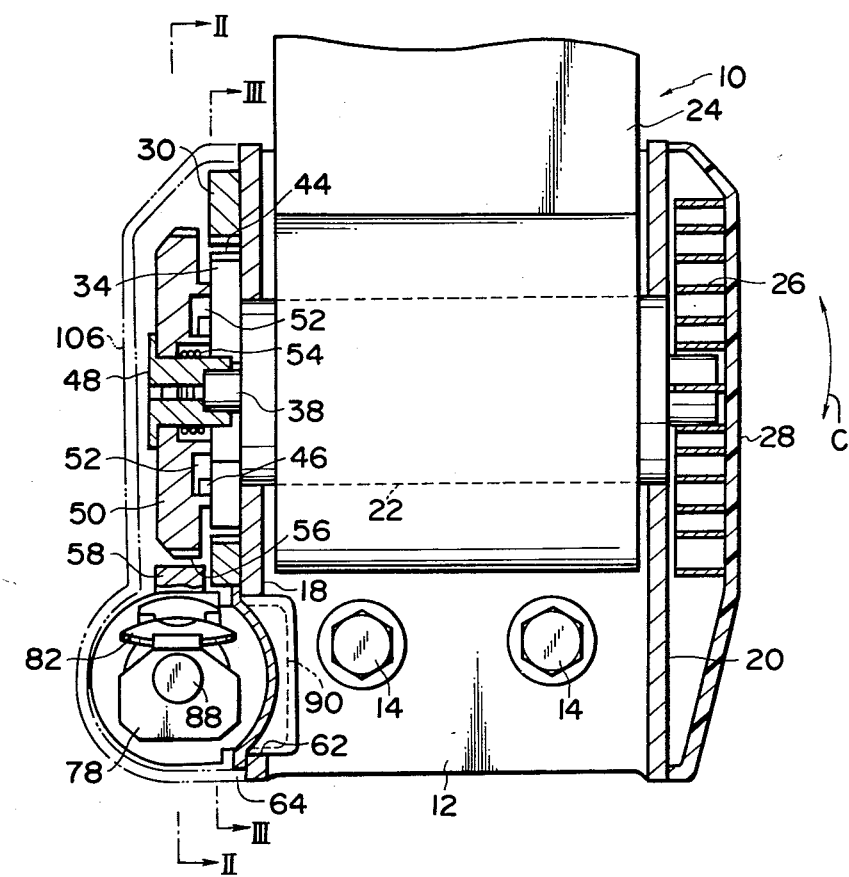
FIG. 1 is a sectional front view showing a retractor, to which the webbing retractor according to the present invention is applied.
Figure 2:
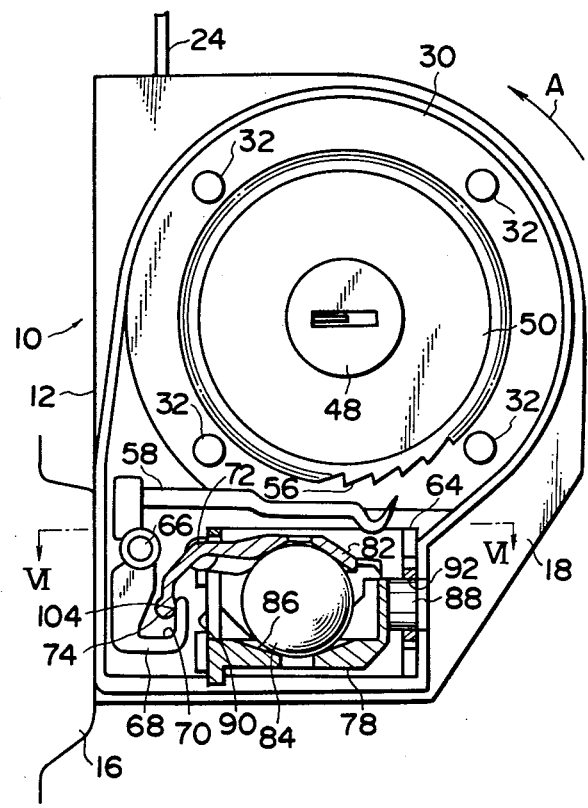
FIG. 2 is a sectional view taken along the line II—II in FIG. 1.

FIGS. 1 and 2 show a webbing retractor 10 according to the present embodiment. This webbing retractor 10 is solidly secured at a frame 12 thereof to a vehicle body 16 through mounting bolts 14. A takeup shaft 22 is journaled across legs 18 and 20, which are extended from opposite side portions of this frame 12 in parallel to each other. One end portion of an occupant restraining webbing 24 is retracted in layers onto the intermediate portion of this takeup shaft 22. An end portion of the takeup shaft 22, which has passed through the leg 20, is secured thereto with an inner end of a spiral spring 26, and an outer end of this spiral spring is engaged with a spring case 28 solidly secured to the leg 20. In consequence, the takeup shaft 22 is biased in the retracting direction of the webbing 24 (a direction indicated by an arrow A in FIG. 2).

Figure 3:
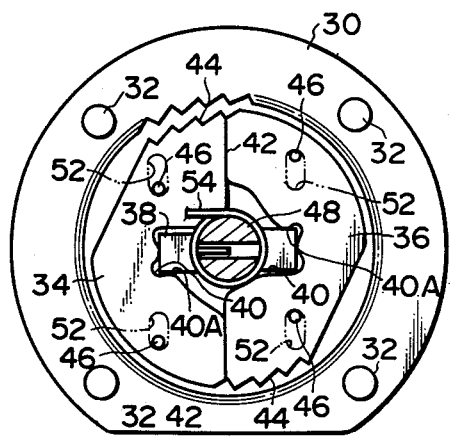
FIG. 3 is a front view corresponding to the sectional view taken along the line III—III in FIG. 1, showing the relations between lock plates and an internal gear ratchet wheel.
Figure 4:
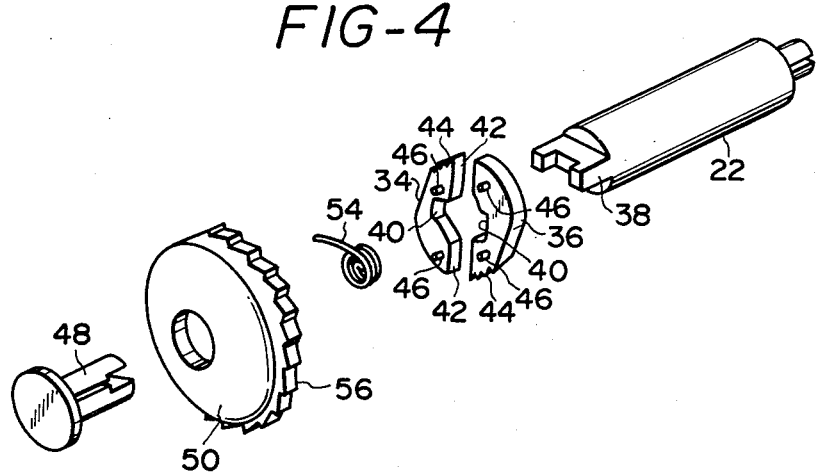
FIG. 4 is a disassembled perspective view showing the essential portions of FIG. 1.

Solidly secured to the outer surface of the leg 18 through four rivets 32 is an internal gear ratchet wheel 30. Opposed to this internal gear ratchet wheel 30 are a pair of lock plates 34 and 36 as shown in FIGS. 3 and 4 as well. These lock plates 34 and 36 are formed at the central portions thereof with recesses 40, respectively, for receiving rectangular projections 38 as being radial projections of the takeup shaft 22, whereby the general configuration of each of the lock plates 34 and 36 is of a substantially C-shape. Furthermore, opposite end portions of these C-shapes, i.e., end faces 42, which interpose therebetween the takeup shaft 22, of the lock plates 34 and 36 are disposed on a straight line incorporating the axis of the takeup shaft 22, and form surfaces abutting against each other.

Formed at portions of the outer peripheries of the pair of lock plates 34 and 36 are locking teeth 44, which come into mesh with the internal gear ratchet wheel 30 when the lock plates 34 and 36 move in directions opposite to each other, whereby rotations of the takeup shaft 22 is stopped. Further, a pair of pins 46 are projected from surfaces at one side of the lock plates 34 and 36 in parallel to the takeup shaft 22, respectively. A pivot 48 is disposed coaxially with the rectangular projections 38 of the takeup shaft 22 and is adapted to rotate conjointly with the takeup shaft 22. A lock ring 50 is journaled on this pivot 48 in a manner to be rotatable relative to the pivot 48, and four slots 52 are formed on the surface at the side of the lock plates. The pins 46 projected from the lock plates 34 and 36 are received in these slots 52, respectively, so that the pair of lock plates 34 and 36 can move in the directions opposite to each other by a stroke of each of the slots 52.

Figure 5:
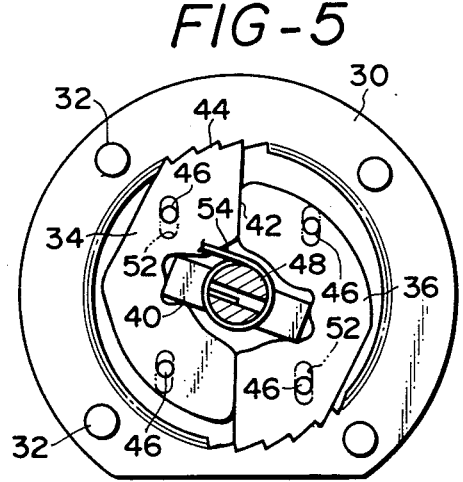
FIG. 5 is a view illustrating the lock plates and the internal gear ratchet wheel shown in FIG. 3 in an engaged position.

Here, a torsion coil spring 54 is confined between the lock ring 50 and the pivot 48, whereby the lock ring 50 is biased in the clockwise direction relative to the takeup shaft 22 as shown in FIG. 3. In consequence, when the takeup shaft 22 is rotated in the webbing unwinding direction below a predetermined value of acceleration, the lock ring 50 is subjected to a biasing force of the spring to rotate in unison with the takeup shaft 22, following the rotation of the takeup shaft 22. However, when an acceleration of the webbing unwinding rotation of the takeup shaft 22 exceeds a predetermined value or the rotation of the lock ring 50 is prevented, the torsion coil spring 54 is deflected to cause a lag in rotation of the locking ring 50 relative to takeup shaft 22. When this lag in rotation occurs, the takeup shaft 22 causes the lock plates 34 and 36 to move in the directions opposite to each other as shown in FIG. 5, and, during this movement, the pins 46 of the lock plates 34 and 36 move in the slots 52.

Additionally, during normal condition where the takeup shaft 22 does not perform a violent webbing unwinding rotation, the pins 46 of the lock plates abut against ends of the slots 52 at one side and portions of the recesses 40, acting as stoppers 40A, abut against the rectangular projection 38 of the takeup shaft and are stopped thereat as shown in FIG. 3.

Figure 6:
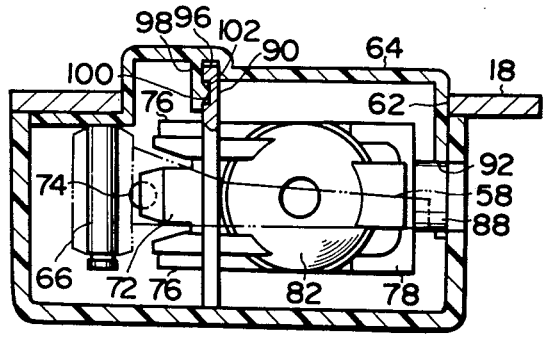
FIG. 6 is a sectional view taken along the line VI—VI in FIG. 2.
Figure 7:
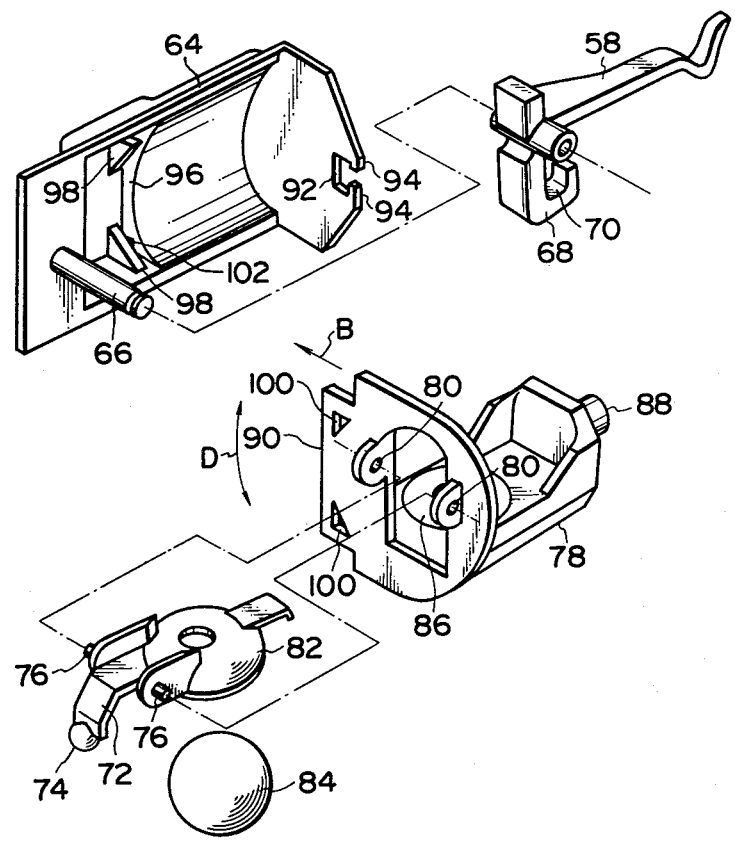
FIG. 7 is a disassembled perspective view showing the essential portions of a locking device.

Ratchet teeth 56 are formed on the outer periphery of the lock ring 50 and are opposed to a pawl 58. As shown in FIGS. 6 and 7 in detail, this pawl 58 is journaled on a pin 66 projected from a bracket 64 secured to a window 62 formed in the leg 18, and, when tilted from the condition shown in FIG. 2, comes into mesh with one of the ratchet teeth 56 to thereby stop the rotation of the lock ring 50.

Extended from a portion of this pawl 58 is a hook 68 of a substantially U-shape, as shown FIG. 2 in looking from the axial direction of the takeup shaft 22. Received in a recess 70 of this hook 68 is a ball 74 formed at one end of a lever 72. Projections 76 formed at the intermediate portions of this lever 72 are received in pivot supporting holes 80 formed in a ball case 78 as being the turning body support member, to thereby be journaled on the ball case 78. Extended from this lever 72 at the side opposite to the ball 74 is a cap portion 82, and this cap portion 82 is rested on a ball 84 as the a movable body received in the ball case 78. This ball 84 is received in a conically inclined surface 86 and disposed at the lower-most position in this conically inclined surface 86 to be held stationary. In consequence, when an acceleration of the vehicle reaches a predetermined value, this ball 84 rolls up along the inclined surface 86 into a movable condition to push the lever 72 up, whereby the ball 74 of this lever 72 causes the pawl 58 to be tilted and meshed with one of the ratchet teeth 56.

Description will now be given of construction of mounting the ball case 78 to the bracket 64. This ball case 78 is mounted to the bracket 64 through a pin 88 projected from one end thereof and a flat plate 90. The axis of the pin 88 serves as a mounting angle changing axis wherein a mounting angle, at which the ball 84 is mounted to the frame 12, is changed. The mounting angle changing axis means a line in which, even if the mounting angle of the flat plate 90 to the base of the support member 78 is changed, the center of the ball 74 of the lever 72 and the axis line of the pin 88 are always aligned with each other. The pin 88 is inserted into a groove 92 formed in a portion of the bracket 64, and projections 94 are projected from opposite end portions of this groove 92, so that the pin 88 can be inserted under a snap action.

On the other hand, the surface of the flat plate 90 perpendicularly intersects the axis of the pin 88 and is inserted between a fixed wall 96 to be integrally affixed to the bracket 64 and a flexible arm 98 projected in parallel to this fixed wall 96. This flat plate 90 is formed at a portion thereof with a cutout 100, into which a projection 102 integrally projected from the arm 98 is inserted and engaged therewith. In consequence, when the ball case 78 is caused to approach the bracket 64 as indicated by an arrow B in FIG. 7, the pin 88 is inserted into the groove 92 and the flat plate 90 is inserted between the fixed wall 96 and the arm 98, and held thereat, respectively.

Here, in order to change the angle at which the retractor frame 12 is mounted to the vehicle body (in directions indicated by a double-headed arrow C in FIG. 1), it is necessary to change the angle at which the ball case 78 is mounted to the bracket 64, so that the ball 84 can be stationary at the lower-most position of the inclined surface 86 at all times during normal operation of the vehicle. In this case, it is possible to achieve the change described above by making and using ball cases 78 wherein the mounting angle of the flat plate 90 about the axis of the pin 88 is changed (in directions indicated by a double-headed arrow D in FIG. 7).

When the mounting angle of the ball case 78 is changed as described above, the ball 74 of the lever 72 and the hook 68 of the pawl 58 merely move relative to each other, whereby the pawl 58 remains stationary, so that no problem is encountered. More specifically, the ball 74 and a contact surface 104 of the recess 70 contacting the ball 74 constitute a transmitting means, and the surface of the recess 70 including this contact surface 104 perpendicularly intersects the axis of the pin 88.

In addition, secured to the outer surface of the leg 18. is a dust cover 106, which covers the lock ring 50 and the like and prevents the ball case 78 from falling off.

In the retractor 10 of the present embodiment with the above-described arrangement, upon entering the vehicle, an occupant unwinds the webbing 24 out of the takeup shaft 22 and fastens the same about himself. No acceleration of a high value in rotation is transmitted to the takeup shaft 22 in winding and unwinding operations during normal using condition of this webbing 24, and the ball 84 remains at the lower-most position of the inclined surface 86, whereby the lock ring 50 follows the rotation of the takeup shaft 22 to rotate in unison therewith, so that the unwinding rotation of the takeup shaft 22 will not be locked.

When the vehicle is in an emergency situation such as a collision, the ball 84, being subjected to an acceleration of the vehicle, rolls up along the inclined surface 86 to push the lever 72 up. In consequence, the ball 74 of this lever 72 drives the recess 70 to tilt the pawl 58 in the counterclockwise direction in FIG. 2. Consequently, this pawl 58 comes into mesh with one of the ratchet teeth 56 to stop the lock ring 50 in rotation.

Thereupon, the occupant, being subjected to an acceleration of the collision and moved under an inertial force, unwinds the webbing 24 from the takeup shaft 22, whereby the takeup shaft 22 and the lock ring 50 rotate relative to each other, the pair of lock plates 34, 36 come into mesh with the internal gear ratchet wheel 30 as shown in FIG. 5. As a result, the webbing 24 is stopped in the unwinding rotation, so that the occupant can be reliably restrained, thereby securing the occupant in a safe condition.

In order to change the angle at which the webbing retractor 10 is mounted to the vehicle body, the angle at which the ball case 78 is mounted to the bracket 64, should be changed. In other words, the ball case 78, in which the mounting angle of the flat plate 90 is changed, is assembled to the bracket 64, so that the change in angle can be readily remedied. In this case, the ball 74 of the lever 72 slides along the recess 70 of the hook 68, so that the pawl 58 will not be tilted.

In addition, if the axis of the ball 74 is aligned with the axis of the pin 88 of the ball case 78, then transmission of a force between the ball 74 and the hook 68 can be effectively performed even if the mounting angle of the ball case 78 is changed.

In the above-mentioned embodiment, description has been given of the construction wherein, when stopped in rotation, the lock ring 50 stops the takeup shaft 22 in rotation through the lock plates 34 and 36, however, this construction may be replaced by one in which the lock ring 50 is solidly secured to the takeup shaft 22 and the pawl 58 is engaged with this lock ring 50 to thereby stop the takeup shaft 22 in its unwinding rotation.

Furthermore, in the above-mentioned embodiment, the ball 84 has been used as the movable body, however, any other movable bodies such as a pendulum may be used as far as movable bodies moved under an acceleration of the vehicle are used.

Furthermore, in the present embodiment, description has been given of the construction wherein the angle at which the flat plate 90 is mounted to the ball case 78 is changed to thereby change the angle, at which the ball case 78 is mounted to the bracket 64, however, the construction may be replaced by one in which the ball case 78 may be mounted to the bracket 64 at a desired mounting angle. To this end, for example, projections provided on the ball case 78 are received in a plurality of recesses formed on the bracket 64 at suitable intervals and around the pin 88, thereby enabling to determine the mounting angle.

As has been described hereinabove, the webbing retractor according to the present invention is constructed such that the tilting force of the lever is transmitted as the tilting force of the pawl, while, the transmitting means for moving the lever and the pawl relative to each other when the angle, at which the turning body support member to the frame is mounted, is changed, and hence, can offer the outstanding advantage that the change in the mounting angle to the vehicle body can be readily remedied.

What is claimed is:

1. A webbing retractor for winding an occupant restraining webbing onto a takeup shaft, comprising:
    a frame mounted to a vehicle body for rotatably mounting said takeup shaft;
    a lock ring disposed coaxially with said takeup shaft to stop said takeup shaft in webbing unwinding rotation;
    a pawl journaled on said frame to engage said lock ring when tilted, to thereby stop said lock ring in rotation;
    a bracket secured to said frame;
    a support member having a plate member at its one end portion and a pin at the other end portion mounted to said bracket through said plate member and said pin, the axis of said pin being disposed on a mounting angle changing axis, said plate member being disposed perpendicularly to said axis, and said pin being inserted into a groove formed on said bracket and being fixed to the bracket under a snap action when said insertion of the pin reaches a predetermined amount;
    a ball housed in said support member which rolls up along a conically inclined surface formed in said support member when subjected to an acceleration;
    a lever journaled on said support member which is tilted when said ball rolls up along said inclined surface; and
    a transmitting means provided between said lever and said pawl and including an insertion portion formed at either one end of said lever or one end of said pawl and a recess formed at the other of said pawl or lever, receiving therein said insertion portion and provided therein with a contact surface contacting said insertion portion, said transmitting means tilting said pawl through said contact surface when tilted, and to cause said insertion portion and said recess to slide on each other when an angle, at which said support member is mounted to said frame, is changed, to thereby prevent said pawl from being tilted.

2. A webbing retractor as set forth in claim 1, wherein said bracket is mounted in a window formed in said frame.

3. A webbing retractor as set forth in claim 2, wherein a groove is formed in a portion of the bracket and projections are projected from opposite end portions of said groove whereby said pin of the support member can be inserted into the groove under a snap action.

4. A webbing retractor as set forth in claim 2, wherein a fixed wall and a flexible arm projected in parallel to said fixed wall is affixed to said bracket, whereby said plate member can be inserted between said fixed wall and flexible arm.

5. A webbing retractor as set forth in claim 4, wherein said plate member perpendicularly intersects said axis of said pin of the support member.

6. A webbing retractor as set forth in claim 4, wherein a cutout is formed on said plate member, into which a projection integrally projected from said flexible arm is inserted and engaged therein.

7. A webbing retractor used in a seatbelt system for protecting an occupant in an emergency situation of a vehicle, comprising:
    a frame mounted to a vehicle body;
    a takeup shaft journaled on said frame, for winding an occupant restraining webbing;
    a lock ring disposed coaxially with said takeup shaft and stopping webbing unwinding rotation of said takeup shaft by its own stop in rotation;
    a pawl engaging said lock ring, when tilted, to thereby stop said lock ring in rotation;
    a bracket secured to said frame;
    a support member having a plate member at its one end portion and a pin at the other end portion mounted to said bracket through said plate member and said pin, the axis of said pin being disposed on a mounting angle changing axis, said plate member being disposed perpendicularly to said axis, and said pin being inserted into a groove formed on said bracket and being fixed to the bracket under a snap action when said insertion of the pin reaches a predetermined amount;
    a movable body held in said support member and moved when subjected to an acceleration;
    a lever tilted when said movable body is moved; and a transmitting means provided between said lever and said pawl and transmitting a tilting force of said lever to said pawl as a tilting force to engage said pawl with said lock ring, and to move said lever and said pawl relative to each other, when an angle, at which said support member is mounted to said frame, is changed, while transmitting the tilting force of said lever to said pawl.

8. A webbing retractor as set forth in claim 7, wherein said groove has a pair of projections projected from opposite end portions thereof and said pin is formed in a column shape.

9. A webbing retractor as set forth in claim 8, wherein said bracket has a fixed wall and a pair of flexible arms parallel to said fixed wall, each of said flexible arms being integrally formed with a projection projected in a direction of the fixed wall, and said plate member is formed with a pair of cutouts at positions opposite to said projections, whereby said plate member is inserted between the fixed wall and flexible arms and is held thereat.

10. A webbing retractor as set forth in claim 9, wherein said lever is disposed through an opening portion formed on said plate member.

11. A webbing retractor as set forth in claim 7, wherein said transmitting means comprises an insertion portion provided at either one end of said pawl or one end of said lever, and a recess for receiving said insertion portion, provided at the other of said pawl or liner.

12. A webbing retractor as set forth in claim 11, wherein said insertion portion presses a contact surface of said recess, when said lever is tilted, to thereby tilt said pawl and to slide on said contact surface.

13. A webbing retractor as set forth in claim 12, wherein said insertion portion is ball-shaped.

14. A webbing retractor as set forth in claim 12, wherein said contact surface perpendicularly intersects the axis of said pin.

15. A webbing retractor as set forth in claim 7, wherein said turning body is a ball, which is disposed at the bottom of a conically inclined surface formed in the support member during normal condition of the vehicle and rolls up along said inclined surface to tilt said lever when subjected to an acceleration.

16. A webbing retractor as set forth in claim 15, wherein said ball is disposed on the axis of said pin.

17. A webbing retractor as set forth in claim 7, wherein said bracket is mounted in a window formed in said frame.

18. A webbing retractor as set forth in claim 17, wherein projections are projected from opposite end portions of said groove whereby said pin of the support member can be inserted into the groove under a snap action.

19. A webbing retractor as set forth in claim 17, wherein a fixed wall and a flexible arm projected in parallel to said fixed wall is affixed to said bracket, whereby said plate member can be inserted between said fixed wall and flexible arm.

20. A webbing retractor as set forth in claim 19, wherein said plate member perpendicularly intersects said axis of said pin of the support member.

21. A webbing retractor as set forth in claim 19, wherein a cutout is formed on said plate member, into which a projection integrally projected from said flexible arm is inserted and engaged therein.

22. A webbing retractor comprising:
a frame mounted to a vehicle body;
a takeup shaft journaled on said frame, for winding an occupant restraining webbing;
a lock ring disposed coaxially with said takeup shaft to stop said takeup shaft in webbing unwinding rotation by its own stop in rotation;
a pawl journaled on said frame which engages said lock ring, when tilted, to thereby stop said lock ring in rotation;
a bracket secured to said frame;
a movable body support member having a plate member at its one end portion and a pin at the other end portion mounted to said bracket through said plate member and said pin, the axis of said pin being disposed on a mounting angle changing axis, and said plate member being disposed perpendicularly to said axis, and said pin being inserted into a groove formed on said bracket and being fixed to the bracket under a snap action when said insertion of the pin reaches a predetermined amount;
a movable body mounted to said frame through said movable body support member which is moved when subjected to an acceleration;
a lever journaled on said movable body support member which is tilted when said movable body is moved;
a transmitting means provided between said lever and said pawl which transmits a tilting force of said lever to said pawl, and said lever moves relative to said pawl when an angle, at which said movable body support member is mounted to said frame, is changed, said transmitting means includes a recess provided at one end of said pawl, for receiving one end of said lever, and a contact surface contacting said lever of said recess perpendicularly intersects the axis of said movable body support member when the angle at which said movable body support member is mounted to said frame is changed.

* * * * *